J. R. REMINGTON.
Carriage.
No. 4,436.
Patented Apr. 4, 1846.
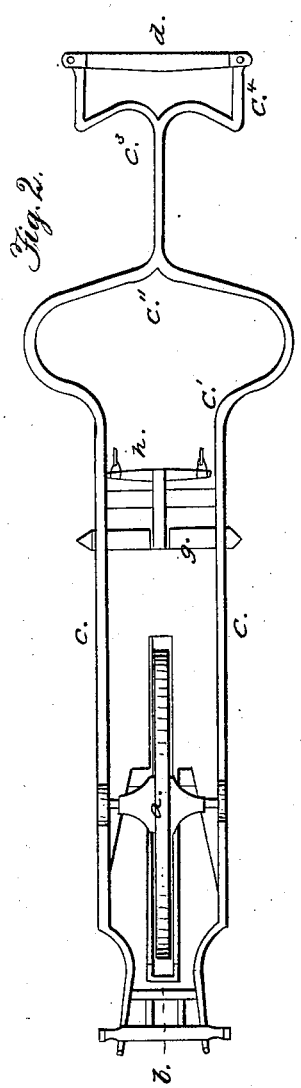
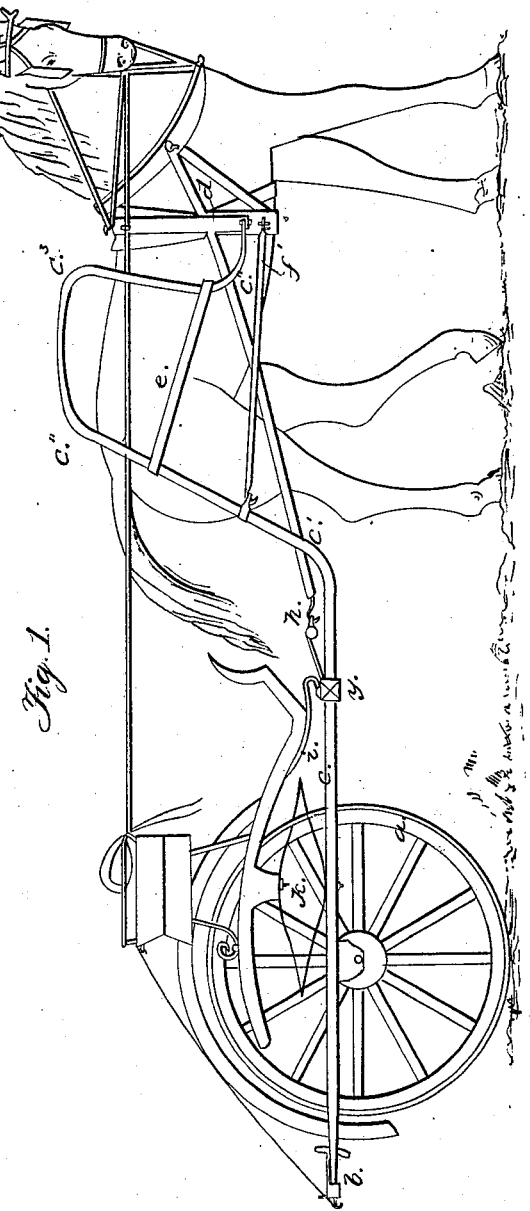

UNITED STATES PATENT OFFICE.

JOHN R. REMINGTON, OF LOWNDES COUNTY, ALABAMA.

IMPROVEMENT IN ATTACHING HORSES TO ONE-WHEELED CARRIAGES.

Specification forming part of Letters Patent No. 4,436, dated April 4, 1846.

*To all whom it may concern:*

Be it known that I, JOHN R. REMINGTON, of the county of Lowndes and State of Alabama, have invented a new and useful Improvement in Carriages called Sulkies, and I do hereby declare that the following is a full, clear, and exact description of the principle or character thereof which distinguishes it from all other things before known, and of the manner of making, constructing, and using the same, reference being had to the accompanying drawings, making part of this specification, in which—

Figure 1 is a side elevation, and Fig. 2 a plan or view of the under side of the carriage.

The same letters indicate like parts in all the figures.

Attempts have heretofore been made to construct carriages to be drawn by horses with one wheel, and thereby save the weight, friction, and expense, &c., incident to two wheeled carriages for carrying small weights, but without success. By my improvement the object is effected by a very simple, cheap, and secure apparatus, rendering it impossible to upset, especially when the horse is drawing, as the tendency of the shafts is, when the body of the carriage cants over, to draw back from the harness.

The construction is as follows: The wheel $a$ is made and connected with the frame of the running-gear something like that of a common wheelbarrow, the axle being made to turn with it. The shafts $c$ are made of light iron rods, and are connected by a cross-bar $b$ behind the wheel, from thence they extend forward on each side in a horizontal line to some distance in front of the wheel, where they curve upward, as shown at $c'$, Fig. 1, and in this part they also bow out, as is more clearly shown at $e'$, Fig. 2. After raising high enough to clear the back of the horse they curve inward till they join, as at $c''$, and thence extend forward, united in a single piece nearly horizontal to the point $c^3$, which is just behind and above the saddle, as clearly represented in Fig. 1, when they again divide and curve downward on each side of the horse, the extreme ends $c^4$ being bent forward into a horizontal line and connected firmly to a plate of iron $d$, that forms the saddle-tree or fits over the saddle, to which it is closely affixed. A strap $e$ extends from near $c^4$ back to the bow $c'$, by which the bows can be drawn together more or less to fit them to any-sized horse. Another strap $f$, which is hitched to bow $c'$ below strap $e$, is carried forward to the saddle-girt at $f'$. A cross-bar $g$ connects the shafts in front of the wheel, to which the whiffletree $h$ is attached. To this bar the front springs $i$ of the body are connected, and an elliptic spring $k$ is placed on each shaft just in front of the axle, directly over which the seat is situated.

The bearings $l$ of the journals of the axle are affixed to the under side of the shafts, and are of common form.

Having thus fully described my improvement and its operation, what I claim therein as new, and desire to secure by Letters Patent, is—

Constructing the shafts of a one-wheeled carriage and connecting them with the horse, substantially in the manner and for the purpose set forth.

JOHN R. REMINGTON.

Witnesses:
M. BLAIR,
PETER C. HOGG.